United States Patent [19]

Balingit et al.

[11] Patent Number: 5,520,583

[45] Date of Patent: May 28, 1996

[54] GOVERNOR DRIVE PULLEY

[76] Inventors: Ronald F. Balingit; Jose T. Castillo, both of 6320 Meadow Haven Dr., Agoura Hills, Calif. 93101

[21] Appl. No.: 328,740

[22] Filed: Oct. 25, 1994

[51] Int. Cl.[6] .................................................. F16H 55/54
[52] U.S. Cl. ........................................................ 474/50
[58] Field of Search ............................ 474/49, 50, 53, 474/56

[56] References Cited

U.S. PATENT DOCUMENTS

| | | | |
|---|---|---|---|
| 616,630 | 12/1898 | Pratt. | |
| 663,928 | 12/1900 | Pratt. | |
| 3,969,948 | 7/1976 | Pipenhagen. | |
| 4,342,559 | 8/1982 | Williams | 474/49 X |
| 4,373,926 | 2/1983 | Fullerton | 474/57 |
| 4,530,676 | 7/1985 | Leonard | 474/52 X |
| 4,652,250 | 3/1987 | Reswick | 474/52 |
| 4,741,546 | 5/1988 | Reswick | 474/52 X |
| 4,832,660 | 5/1989 | Leonard | 474/49 |
| 4,836,046 | 6/1989 | Chappel | 474/57 X |
| 5,407,395 | 4/1995 | Kramer | 474/49 |

Primary Examiner—Roger J. Schoeppel

[57] ABSTRACT

A governor drive pulley capable of having a wide variation in effective pulley radius and automatically performing predetermined mechanical control functions. The pulley includes sheave segments mounted on an energy-storing flexible chassis. Predetermined mechanical control is achieved by customizing the energy-storing component of the chassis.

3 Claims, 1 Drawing Sheet

FIG. 2 (C-C)

GOVERNOR DRIVE PULLEY

BACKGROUND OF THE INVENTION

A. Field of the Invention

This invention relates to an automatic drive pulley, more specifically to an improved drive pulley capable of having a wide variation in effective pulley radius and automatically performing predetermined mechanical control functions.

B. Description of the Prior Art

In the selection of a drive pulley, it is common practice to determine the effective pulley radius and the dimensions of the pulley working surface to closely match the power of the energy source with the power requirement of the load. In cases where the torque requirement of the load varies significantly, means must be provided to avoid a significant mismatch between the power of the energy source and the power requirement of the load.

Prior art inventors have created mechanisms to minimize or avoid such a power mismatch. Prior art mechanisms are those that require manual intervention and those that automatically sense load and self adjust the effective pulley radius in the desired direction.

Prior art mechanisms requiring manual intervention include the stepped pulley, the conical pulley, the stepped sprocket and the manually adjustable split pulley.

Among the earliest to develop drive pulleys with automatic load-sensing and self-adjusting features is John C. Pratt. Pratt's pulleys under U.S. Pat. No. 616,630 issued December 1898 and U. S. Pat. No. 663,928 issued December 1900 self adjust to an increase in load by reducing the radius of the drive pulley. With a decrease in load, Pratt's pulleys adjust in the opposite direction. Pratt uses coil springs to create the automatic effect and rigid linkages to connect the sheave segments to the shaft.

U.S. Pat. No. 4,652,250 issued March 1987 and U.S. Pat. No. 4,741,546 issued May 1988 to James B. Reswick, U.S. Pat. No. 4,373,926 issued February 1983 to Robert L. Fullerton, U.S. Pat. No. 3,969,948 issued July 1976 to Charles A. Pipenhagen, Jr. and U.S. Pat. No. 4,836,046 issued June 1989 to Gilmore H. Chappel disclose automatic transmisions with load-sensing and self-adjusting features. The drive pulley of the transmissions use torsion springs to create the automatic effect and rigid linkages to connect the sheave segments to the shaft.

U.S. Pat. No. 5,407,395 issued April 1995 to Hubert Kramer discloses a steplessly variable belt drive for bicycle with load-sensing and self-adjusting features. The drive pulley of the transmission uses rigid arms as sheave segments and pivoted at the hub. Compression springs are used to urge the rigid arms outward and to create the automatic effect.

The use of rigid linkages or rigid arms in the above-mentioned prior art devices limits the variation in effective pulley radius due to mechanical interference.

U.S. Pat. No. 4,342,559 issued August 1982 to Robert N. Williams discloses a drive system with load-sensing and self-adjusting features. The drive system uses two sideplates to position the sheave segments. The drive pulley of the drive system uses helical tension springs or a horseshoe spring to create the automatic effect.

Prior art mechanisms in the field of automatic drive pulleys provide a rough adjustment of the drive pulley radius in the desired direction to minimize the mismatch between the power of the energy source and the power requirement of the load. They all adjust within the pulley operating range such that an increase in belt tension is followed by a decrease in effective drive pulley radius and vice versa. However, the relationship between the belt tension, input torque and effective drive pulley radius in the pulley operating range is not well defined. There is no prior art for automatic drive pulleys that can be customized to perform a predetermined automatic control function over the pulley operating range.

SUMMARY OF THE INVENTION

A. Objects and Advantages

This invention can be customized to perform a predetermined mechanical control function over the pulley operating range. It can be used where constant input power is desired to prevent overload or to maintain peak efficiency such as in an engine or electric motor drive. It can be used where constant input torque is desired such as in a bicycle to allow the rider to pedal with a constant force. It can be used in other special applications such as constant belt tension to apply a constant force to a load.

This invention eliminates the mechanical interference problem in the prior art and allows large variations in effective pulley radius.

This invention has shock absorbing capability which makes it suitable for shock loading applications.

Further objects and advantages of this invention will become apparent from a consideration of the drawings and ensuing description.

B. Combinations with other Mechanisms

This invention can be used in combination with other mechanisms that take up belt slack and deliver power to the load. Combinations with other mechanisms include:

a. This governor drive pulley with a belt and an expansible driven pulley suitably sized to take up all possible belt slack over the operating range of the drive pulley.

b. This governor drive pulley with a belt and an expansible driven pulley and a movable idler pulley to take up all possible belt slack over the operating range of the drive pulley.

c. This governor drive pulley with a belt, a fixed radius driven pulley and a movable idler pulley to take up all possible belt slack over the operating range of the drive pulley.

d. This governor drive pulley as a winch with a belt to pull a load.

C. Possible Novel Features

The features of this invention that can be considered novel include:

a. Use of springs to connect the shears segments to the shaft hub. The springs wrap around the hub to reduce pulley radius and deflect away from the hub to increase pulley radius. This allows large variations in pulley radius.

b. Use of customized springs whose mechanical properties, shape and dimensions are predetermined over the entire cantilevered length of the springs. This allows the pulley to perform a predetermined mechanical control function.

c. Use of the ribbed and grooved disc. The ribs provide added structural strength to the disc and the grooves provide the means for the proper radial alignment of the shears segments. The closed ribs prevent the entry of foreign material into the sides of the pulley.

D. Description of the Invention

This invention comprises sheave segments governed by an energy-storing flexible chassis with means for connecting to the source of rotational energy.

Each sheave segment has a working surface properly shaped and treated to transmit frictional force to a belt. Each sheave segment is pivotably connected to one end of a spring. The other end of the spring is rigidly fastened to a shaft hub. The sheave segments interact with equally angularly spaced grooves in at least one disc to allow radial motion of the sheave segments along the grooves and to prevent rotation of the sheave segments with respect to the grooves. The discs provide axial alignment of the sheave segments and gang the springs together for simultaneous and uniform action by the springs. The discs are free to rotate about the shaft hub and are held by suitable means to minimize axial motion. The pulley is assembled with a uniform spring preload to provide for an initial belt preload without a change in pulley radius.

The pulley is at maximum radius in the unloaded condition. As the pulley transmits power, a point will be reached when the net belt tension will overcome the preload of the springs causing the springs to wrap around and the discs to rotate about the shaft hub. As the net belt tension continues to increase, the springs will continue to wrap around the shaft hub or on the wrapped portion of the other springs until equilibrum is attained between the net belt tension and the spring forces. This will result in a reduction in effective pulley radius. The effective pulley radius is determined by the length of the cantilevered sections of the springs. The length is a function of the physical properties of the spring and the force applied. This allows customization of the springs for a specific mechanical control function over the operating range of the pulley. Contraction of the pulley will continue with increasing load until the minimum effective radius is reached. A decrease in load will cause the springs to deflect away from the shaft hub resulting in an increase in effective pulley radius. Within the operating range of the pulley, the predetermined mechanical control function will govern.

BRIEF DESCRIPTION OF THE DRAWINGS

A. Figures

FIG. 2 is sectional view C—C as indicated in FIG. 1. of one embodiment of the pulley.

B. List of Reference Numerals

1—Sheave Segment
2—Spring
3—Disc
4—Pin
5—Collar
6—Shaft Hub
7—Groove in the Disc
8—Rib on the Disc
9—Rib on the Sheave Segment
10—Belt
11—Drive Shaft

DETAILED DESCRIPTION OF THE DRAWINGS

Figure 1:
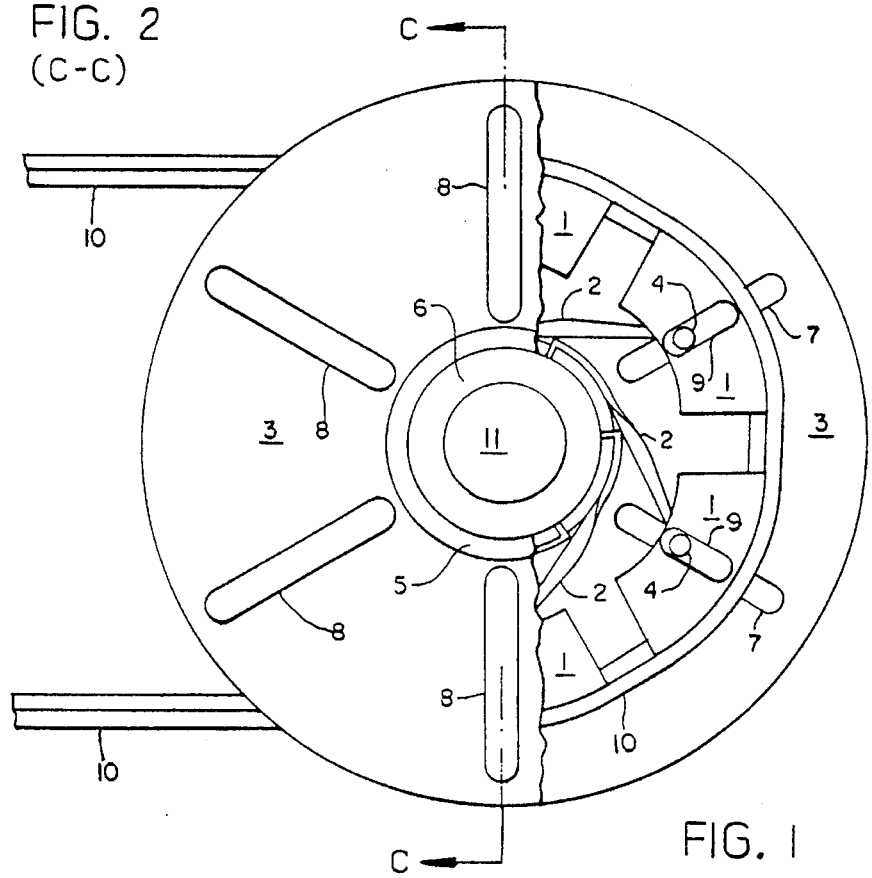
FIG. 1 is a side view of one embodiment of the pulley with a cutaway of a disc and a collar.

FIG. 1 generally illustrate a side view of an embodiment of this governor drive pulley with a cutaway of one disc and a collar to illustrate the springs and sheave segments in an intermediate position within the operating range of the pulley. The direction of rotation of the pulley as shown is counterclockwise. FIG. 2 is a sectional view C—C as indicated in FIG. 1 of one embodiment of the pulley.

A flexible belt 10 transmits power to a driven device, which is not shown in the figures, through friction with sheave segments 1 in contact with the belt. Sheave segments 1 are connected to a shaft hub 6 by springs 2. One end of springs 2 is pivotably connected to sheave segments 1 by pins 4. The other end of springs 2 is firmly fastened to shaft hub 6 by suitable means. Ribs 9 allow radial motion of sheave segments 1 along grooves 7 of discs 3 and prevent rotational motion of sheave segments 1 with respect to grooves 7. This ensures uniform surface contact between belt 10 and sheave segments 1 and minimizes high stress areas on the belt surface.

Each spring 2 and the corresponding grooves 7 on discs 3 are equally angularly spaced with each neighboring spring and corresponding grooves to ensure uniform action by all springs.

Ribs 8 on discs 3 provide added structural strength to the discs. Grooves 7 are on the concave side of the ribs.

Discs 3 are free to rotate about shaft hub 6 and are held axially in place by suitable means. FIG. 2 illustrate one embodiment of the pulley using collars 5 to prevent axial movement of discs 3.

FIG. 1 illustrate one position of the pulley inside the automatic operating range. The figure shows springs 2 have already wrapped around the shaft hub and are about to wrap around the neighboring spring. Any further increase in load will cause springs 2 to wrap around further, move discs 3 clockwise with respect to shaft hub 6 and move sheave segments 1 radially inward thereby effecting a reduction in effective pulley radius. Any belt slack will be taken up by external mechanisms such as movable idler pulleys and expansible pulleys. The energy-storing flexible chassis consists of the assembly of springs 2, discs 3, shaft hub 6 and collars 5.

FIG. 1 illustrate an embodiment of the pulley using springs which are leaf springs with a cross-wise curvature to increase the rigidity of the cantilevered portion and to limit bending of each spring near the point where the spring is in contact with the shaft hub or with the wrapped portion of the other spring. The cross-wise curvature keeps the cantilevered portion nearly straight and simplifies the customization of the springs.

Figure 3:
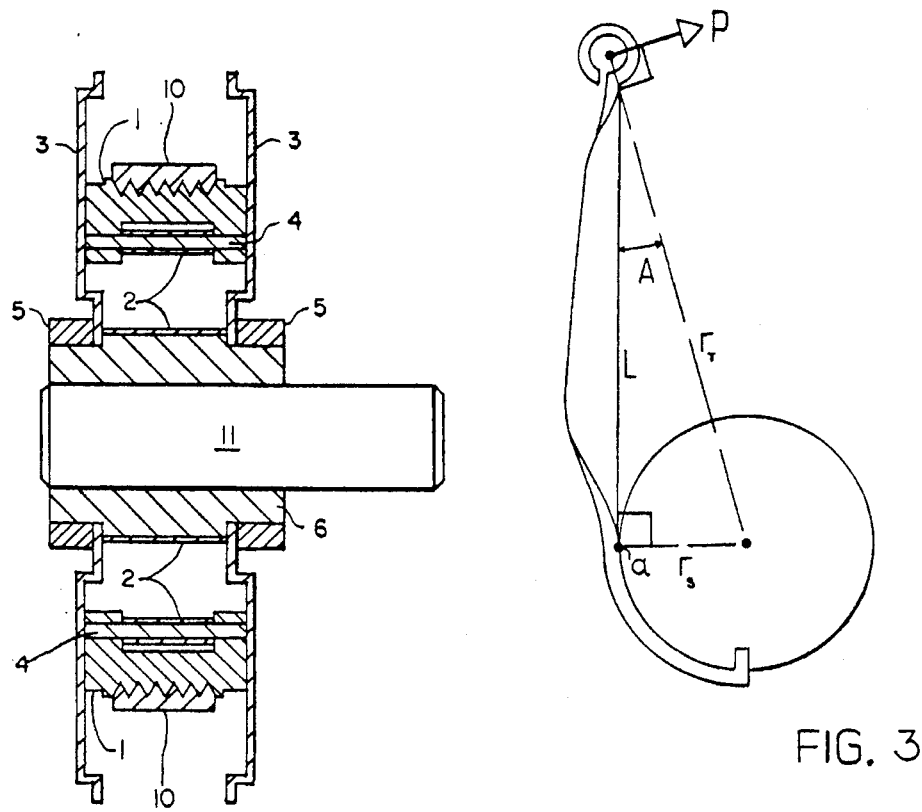
FIG. 3 is a schematic diagram of one spring with one end fastened to the shaft hub and the other end actuated by a tangential force P.

FIG. 3 is a schematic diagram of one spring with one end fastened to the shaft hub by some suitable means and the other end actuated by a tangential force P.

I will use FIG. 3 to present a theoretical analysis of this governor drive pulley. Three representative cases will be presented. It should be noted that other mechanical control functions are possible with this invention.

The following analysis assumes low angular speeds such that the effects of centrifugal forces are negligible. The centrifugal forces of a sheave segment and a spring are negligible if they are significantly less than the belt tension. If the centrifugal forces are significant, a new set of equations should be developed for a specific application of this invention.

The following symbols will have the corresponding meanings in the analysis:

A—Angle
E—Modulus of elasticity in tension or compression

F—Pure tensile force
$F_1$—Belt tension in the slack side of the belt
$F_2$—Belt tension in the power delivery side of the belt
$F_E$—Shaft reaction caused by the vector sum of $F_1$ and $F_2$
hp —Horsepower transmitted by the pulley
L—Length of unwrapped or cantilevered portion of the spring
M—Bending moment
N—Revolutions per minute of the pulley
p—Tangential force acting on each spring
Q—Radial distance from the working surface of the pulley to the pivot connection to the spring
R—Effective radius of the pulley
$R_c$—Radius of curvature
$r_s$—Shaft hub radius
$r_T$—Lever arm of P with respect to axis of rotation of the pulley
S—Total stress
$S_F$—Flexural stress
$S_{AF}$—Allowable flexural stress
$S_T$—Tensile stress
T—Torque
t—Thickness of the spring
u—Number of sheave segments
W—Width of the spring
Z—Section modulus of the spring Potential energy is stored in the energy-storing flexible chassis (12) by the spring preload when the pulley is assembled. When the pulley is delivering power, the pulley is subjected to the belt tension in the slack side of the belt $F_1$ and the belt tension in the power delivery side of the belt $F_2$. The vector sum of $F_1$ and $F_2$ is the reaction $F_E$ at the shaft of the pulley. Since $F_1$ and $F_2$ are both tangential to the working surface of the pulley, the difference between $F_2$ and $F_1$ creates the torque required for power delivery. $F_1$ could cause additional potential energy to be stored in the energy-storing flexible chassis. $F_1$ could be minimized through the proper selection of the belt and working surface of the sheave segments. V-belts and multi-grooved flat belts have a gripping action created by the smaller groove angle of the sheave segments and, consequently, require a small value of $F_1$. A small value of $F_1$ is desirable in order to conserve the length of the spring available for automatic control.

The discs gang the springs together for simultaneous and uniform action by the springs. Consequently, the resultant tangential force $F_2$ minus $F_1$ is opposed by all the springs. The force P shown in FIG. 3 is the tangential force acting on each spring. Force P is given by:

$$P = \frac{(F_2 - F_1)}{u} \times \frac{R}{r_T}, \text{ where } R = r_T + Q$$

The cantilevered portion of the spring shown in FIG. 3 has a higher section modulus than the wrapped portion due to the outward cross-wise curvature of the spring. The cross-wise curvature improves the rigidity of the cantilevered portion and keeps the cantilevered portion essentially straight.

The spring is subjected to bending and direct tension. The maximum bending moment occurs near point a in FIG. 3 and is given by:

$$M = PL \cos A \quad (1)$$

The tensile force uniformly distributed in the spring is given by:

$$F = P \sin A \quad (2)$$

The outermost fiber of the spring near point a in FIG. 3 will be subjected to the greatest stress because the flexural stress and tensile stress are additive in that fiber. The flexural stress, which is tensile in the outermost fiber and compressive in the innermost fiber, is given by:

$$S_F = \frac{M}{Z} \quad (3)$$

The section modulus for a rectangular cross section is given by:

$$Z = \frac{Wt^2}{6} \quad (4)$$

From FIG. 3 cos A is given by:

$$\cos A = \frac{L}{r_T} \quad (5)$$

Applying equations 1, 4 and 5 in equation 3, we obtain the equation for flexural stress:

$$S_F = \frac{6PL^2}{Wt^2 r_T} \quad (6)$$

The tensile stress is given by:

$$S_T = \frac{F}{wt} \quad (7)$$

From FIG. 3 sin A is given by:

$$\sin A = \frac{r_S}{r_T} \quad (8)$$

Applying equations 2 and 8 in equation 7, we obtain the equation for tensile stress:

$$S_T = \frac{P r_S}{W t r_T} \quad (9)$$

The total stress in the outermost fiber of the spring near point a in FIG. 3 is obtained by adding equations 6 and 9 and simplifying:

$$S = \frac{P(r_S t + 6L^2)}{w t^2 r_T} \quad (10)$$

Another form of equation 10 is obtained by substituting the expression $(r_s^2 + L^2)^{1/2}$ instead of $r_T$. By so doing, we obtain the equation for total stress in terms of the spring dimensions, the force acting on the spring, and the radius of the shaft hub.

$$S = \frac{P(r_S t + 6L^2)}{w t^2 (r_S^2 + L^2)^{1/2}} \quad (11)$$

Rewriting equation 11 into W as a function of L, we obtain:

$$w = \frac{P}{st^2} \frac{(r_S t + 6L^2)}{(r_S^2 + L^2)^{1/2}} \quad (12)$$

Assuming $S, r_s$ and t are held constant, differentiating equation 12 with respect to L produces:

$$\frac{dw}{dL} = \quad (13)$$

$$\frac{P}{st^2} \frac{[6L^3 + r_S L(12r_S - t)]}{(r_S^2 + L^2)^{3/2}} + \frac{(r_S t + 6L^2)}{st^2(r_S^2 + L^2)^{1/2}} \times \frac{dp}{dL}$$

In the actual application $r_s$ is greater than t, hence the fraction containing the brackets is positive. The second fraction containing dp/dl is negative if P is decreasing with an increasing value of L. A positive value of dw/dl indicates the width of the spring increases with the cantilevered length of the spring and will result in a tapering spring. This tapering should be verified to justify the assumption that the maximum stress occurs near point a and not in the wrapped portion of the spring.

To determine the dimensions of the spring for a desired mechanical control function of the pulley, the thickness of the spring can be obtained from the flexure formula applicable to materials obeying Hooke's law. The value of t is given by:

$$t = \frac{2S_{AF}r_s}{E} \quad (14)$$

For a given spring material obeying Hooke's law, $S_{AF}$ and E can be determined. Equation 14 assumes the radius of curvature $R_c$ is equivalent to $r_s$. This is a conservative assumption because the smallest radius of the wrapped portion of the spring is $r_s$.

The width of the spring W for a particular value of L can be obtained from equation 12 by substituting the known values of P, $r_s$, t and L and assuming S equals $S_{AF}$ of the spring material. By assuming S equals $S_{AF}$, the actual flexural stress $S_F$ due to the bending moment M will be less than $S_{AF}$ which should provide additional conservatism to the analysis.

By calculating the values of W for several intermediate values of L over the operating range of the pulley radius, the dimensions and shape of the spring can be determined. In the numerical examples provided under the three representative cases, only two values of W are calculated to provide a flavor of the aesthetics of the components of the pulley and to establish the tapering nature of the springs. Only two points are necessary to establish the tapering nature because equation 12 is continuous for all values of L.

If the width of the spring W calculated from equation 12 is greater than the width of the shears segment, a laminated spring should be used.

The width of the laminations throughout the cantilevered length of the spring should be such that the total width of the laminations near point a of FIG. 3 equals W.

Following are some representative cases for specific mechanical control functions of this governor drive pulley.

Case 1

Constant power delivery from a constant speed power source such as an electric motor or an engine with a speed governor. To make the effect of centrifugal forces negligible, the governor drive pulley is an intermediate drive whereby the angular speed is reduced from the power source to the pulley drive shaft and is changed from the pulley drive shaft to the load.

$$T = 63,000 \frac{hp}{N} \text{ — torque of the shaft}$$

$$T = uPr_T \text{ — torque of the energy-storing flexible chassis}$$

$$\text{hence: } P = \frac{63,000 \, hp}{ur_T N}$$

with hp, u and N constant, this is the relationship we are looking for between P and $r_T$. This relationship is a hyperbolic function between P and $r_T$.

Substituting this expression for P and the relationship $r_T = (r_s^2 + L^2)1/2$ into equation 12, we obtain:

$$w = \frac{63,000 \, hp}{SuNt^2} \frac{(r_s t + 6L^2)}{(r_s^2 + L^2)} \quad (15)$$

Following is a numerical example using: hp=2 horsepower, N=200 rpm, $S_{AF}$=150,000 psi, E=30×10⁶ psi, u=8 shears segments and $r_s$=2 inches. Find t and W when L is 4 inches and 2 inches.

From equation 14, t=0.02 inches.

From equation 15 for L=4 inches, W=6.30 inches. If the sheave segments are 1½ inches wide, at least five laminations are necessary.

From equation 15 for L=2 inches, W=3.95 inches. The smaller value of W for L=2 inches indicates the tapering nature of the spring.

Case 2

Case Constant torque applied by a variable speed power source such as the pedals of a bicycle powered by the rider.

$$T = uPr_T \text{ — torque of energy-absorbing flexible chassis}$$

$$\text{hence: } P = \frac{T}{ur_T}$$

This is a hyperbolic relationship between P and $r_T$. Substituting this expression for P and the relationship $r_T(r_s^2 + L^2)1/2$ into equation 12, we obtain:

$$w = \frac{T}{Sut^2} \frac{(r_s t + 6L^2)}{(r_s^2 + L^2)} \quad (16)$$

Following is a numerical example using: T=80 lb-inch, $S_{AF}$=150,000 psi, E=30×10⁶ psi, u=6 sheave segments and $r_s$=1.5 inches. Find t and W when L=3 inches and L=1.5 inches.

From equation 14, t=0.015 inches.

From equation 16 for L=3 inches, W=1.90 inches. If the shears segments are 1 inch wide at least two laminations are necessary.

From equation 16 for L=1½ inches, W=1.19 inches. The smaller value of w for L=1½ inches illustrates the tapering nature of the spring.

Case 3

Constant belt tension and low speed power source such as a winch pulling a load.

$$T = (F_2 - F_1)R \text{ — torque applied by belt on the pulley}$$

$$-T = uPr_T \text{ — opposing torque by the energy-storing flexible chassis}$$

The magnitudes of the torques are equal, hence:

$$(F_2 - F_1)R = uPr_T \quad (17)$$

Substituting $R=(r_T+Q)$ and $r_T=(r_s^2+L^2)1/2$ into equation 17 and simplifying:

$$P = \frac{(F_2 - F_1)}{u} \left[ 1 + \frac{Q}{(r_s^2 + L^2)^{1/2}} \right] \quad (18)$$

$F_2$ is constant. With proper belt and sheave selection, $F_1$ can be made to be significantly less than $F_2$. Hence, an approximate equation for P can be obtained.

$$P = \frac{F_2}{u} \left[ 1 + \frac{Q}{(r_s^2 + L^2)^{1/2}} \right] \quad (19)$$

This expression for P can be substituted into equation 12 to obtain:

$$W = \frac{F_2}{Sut^2} \frac{[(r_s^2 + L^2)^{1/2} + Q](r_s t + 6L^2)}{(r_s^2 + L^2)} \quad (20)$$

Following is a numerical example using: $F_2$=400 pounds, $S_{AF}$=150,000 psi, E-30×10⁶ psi, u-10 sheave segments, Q=½ inch and $r_s$=3 inches. Find t and W when L is 4 inches and 2 inches.

From equation 14, t=0.03 inches.

From equation 20 for L=4 inches, W=6.26 inches. If the sheave segments are 3¼ inches wide at least two laminations are necessary.

From equation 20 for L=2 inches, W=2.25 inches. The smaller value of W for L=2 inches illustrates the tapering nature of the spring.

It is clear from the preceding analysis that the springs can be customized to allow the governor drive pulley to perform a specific mechanical control function.

Although high-grade steel leaf springs are used in the numerical examples, other spring materials can be used in this invention provided care is taken to not violate Hooke's law. Other spring shapes can also be used provided care is taken to not violate Hooke's Law.

If the width and thickness of the spring are uniform over the entire length, the relationship between the force P and the radius $r_T$ can be obtained by substituting $r_T$ instead of $(r_s^2+L^2)1/2$ and $(r_T^2-r_s^2)$ instead of $L^2$ into equation 12. By so doing and solving for P, we obtain:

$$P = \frac{wst^2 r_T}{(6r_T^2 - 6r_s^2 + r_s t)}$$

This is the type of the relationship between P and $r_T$ that might be expected from prior art mechanisms using springs with a uniform cross section.

Some ramifications of this invention include the following:

Discs with radial slits, as used in the prior art, can also be used instead of the ribbed and grooved discs. Mechanical stops on the shaft hub and the discs can be used to prevent damage to the springs when the direction of rotation is reversed.

Single or multiple V-belts, multigrooved flat belts, plain flat belts or cables can be used to transmit the power to the driven device.

I claim:

1. A governor drive pulley comprising:

two coaxial discs, each having a plurality of angularly equispaced equal-length radial grooves equispaced from the axis;

a plurality of belt-engaging sheave segments located between said discs, a radial rib extending laterally from each side of said segments facing said discs and being received in said grooves of said discs, and a pin connection in the concave side of each of said segments;

a hub rotatable about a drive axis, having lateral ends to receive said discs and to allow rotation about the hub of said discs while maintaining the parallelism of said discs, and having a plurality of angularly equispaced connections for springs; and a plurality of said springs, each spring having one end connected to said segments by said pin connection and the other end connected to said hub by one of said connections urging said segments outward from said hub.

2. The governor drive pulley defined in claim 1 wherein said springs are leaf springs with a crosswise curvature.

3. The springs in claim 2 wherein said springs are installed on said hub with the convex side facing said hub.

* * * * *